Aug. 9, 1927. 1,638,233
J. P. BALDWIN ET AL
SHOCK ABSORBER
Filed March 24, 1925 3 Sheets-Sheet 2
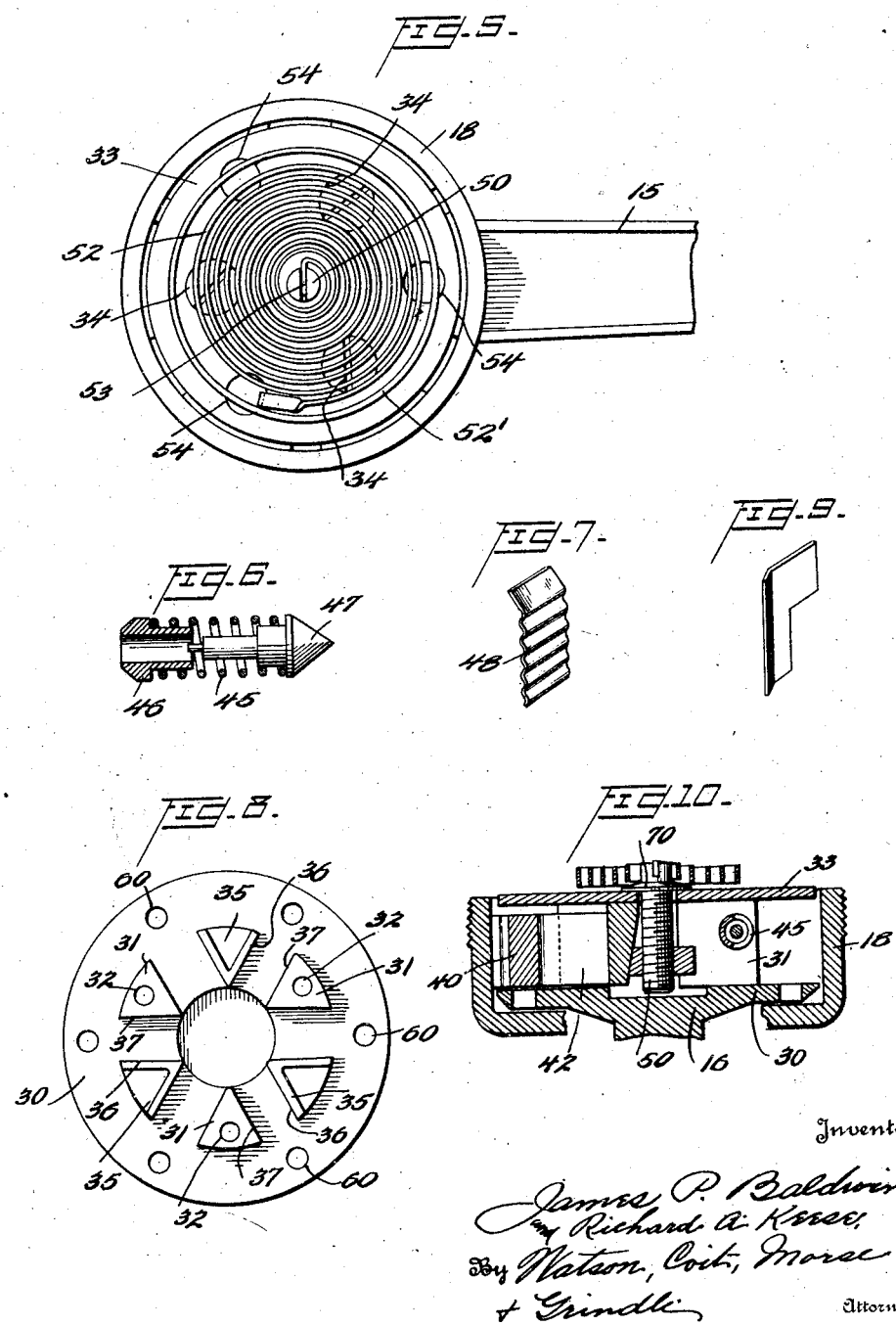

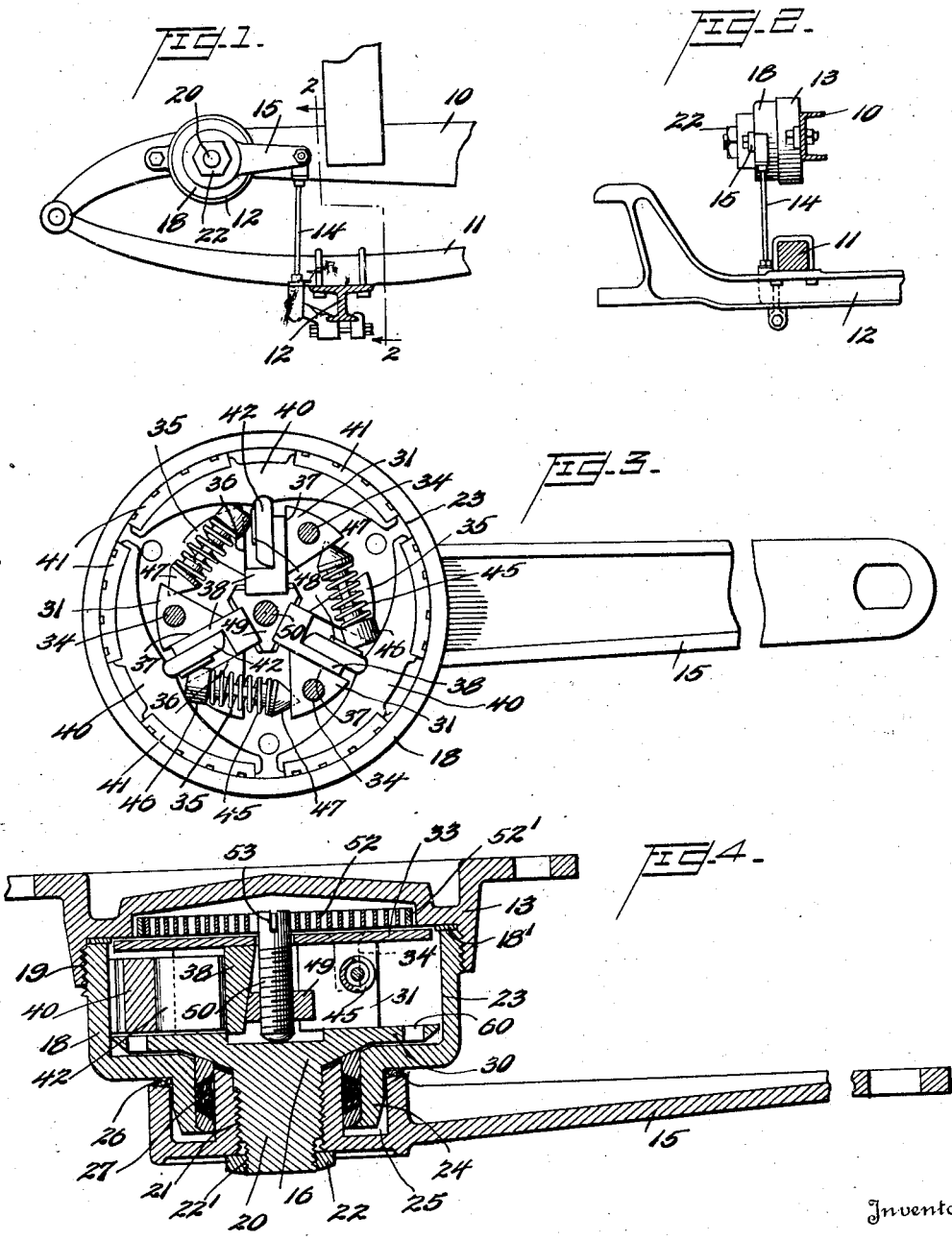

Aug. 9, 1927.  J. P. BALDWIN ET AL  1,638,233
SHOCK ABSORBER
Filed March 24, 1925   3 Sheets-Sheet 3

Inventor
James P. Baldwin
and Richard A. Keese.
By Watson, Coit, Morse & Grindle
Attorney Patented Aug. 9, 1927.

1,638,233

UNITED STATES PATENT OFFICE.

JAMES PIERCE BALDWIN AND RICHARD A. KEESE, OF LOS ANGELES, CALIFORNIA; SAID KEESE ASSIGNOR TO SAID BALDWIN.

SHOCK ABSORBER.

Application filed March 24, 1925. Serial No. 18,043.

The present invention relates to shock absorbers of the sliding clutch type such as disclosed in my Patent No. 1,521,588, granted December 30, 1924, adapted to be used particularly in connection with motor vehicles.

An object of the invention is to provide a shock absorber of great effectiveness in damping out the vibrations of automobile car bodies, which is at the same time of a comparatively simple nature, light in weight, easy to install, and which will operate for long periods of time without attention.

The features of novelty reside in the details of construction and arrangement of the parts of the shock absorber, which details will be fully described in the following specification and set forth particularly in the claims. It will be understood, however, that the invention is not limited to the exact details illustrated and described, but contemplates certain changes of design and arrangement of its constituent elements.

In the drawings accompanying the specification:

Figure 1 illustrates in side view the rear end of an automobile side frame and associated spring, showing the manner of attachment of my improved shock absorber;

Figure 2 is a section on line 2—2 of Figure 1;

Figure 3 is a transverse section through the shock absorber;

Figure 4 is a longitudinal section therethrough;

Figure 5 is a plan view of a portion of the shock absorber showing the spring which assists in effecting the automatic adjustment;

Figure 6 is a longitudinal view, partly in section, of a detail;

Figure 7 is a perspective view of a sound deadening shim;

Figure 8 is a plan view of the oscillating core;

Figure 9 is a perspective view of a modified form of sound deadening shim;

Figure 10 is a longitudinal section through a portion of a partially modified form of shock absorber;

Figure 11:
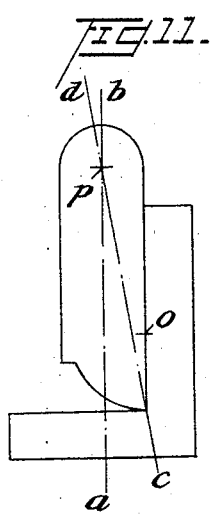
Figures 11, 12 and 13 are views illustrating one way in which the curved ends of the struts may be developed.

The side frame or sill of a motor vehicle is indicated at 10 in the drawings, the spring at 11 and axle at 12. Secured to the side frame is the base 13 of the shock absorber, and connected to the axle 12 by means of a suitable link 14 is the arm 15 of its oscillating core 16. The base 13 and core 16 are concentric, and the core is retained in position by the casing 18 threaded to the base at 19, a washer 18' of lead or other suitable material being interposed between the casing and base to effect a tight union. For purposes of assembly, the arm 15 is formed separately from the stem 20 of core 16 and is threaded thereon at 21, being locked in position by nut 22 also threaded to this stem at 22'. The case 18 has a relatively large cylindrical portion, the inner surface 23 of which constitutes a stationary cylindrical friction face against which the brake shoes of the shock absorber rub.

The case is also provided with an axially extending neck 24 of smaller diameter which extends within an annular recess 25 of crank arm 15. A washer 26 fits snugly between the crank arm and the casing to prevent the entrance of dust, and packing material 27 is also included between the inner wall of neck 24 and the cylindrical portion of arm 15 which encircles and is threaded to the stem 20.

That portion of the core 16 which lies within the enlarged portion of the casing comprises a plate 30, integral with the stem 20, and six segmental lugs integral with and projecting from the inner surface of the plate. The alternate lugs 31 extend substantially to the plane of the inner end of the casing and are provided with threaded holes 32. A flat circular plate 33 is secured to the tops of these lugs by screws 34. The other segmental lugs 35 are substantially half as high as lugs 31 and are necessary to provide faces 36 which are parallel to and cooperate with the faces 37 of lugs 31 in forming a slideway for the L-shaped strut seats 38 which are free to move in a substantially radial direction, but which must be held against circumferential movement. Lugs 35 also constitute abutments limiting the swinging movement of the struts hereafter to be described.

The brake shoes are indicated at 40, each having spaced leather facings 41 which contact with the friction face 23 of the casing. The facings 41 are preferably grooved as shown in my application No. 525,082, and may be assembled without undergoing a preliminary softening process, by simply binding them into an arc and then forcing them into place in the dove tail projections on the face of the shoe by means of a punch press and dies of the proper curvature.

Figure 12:
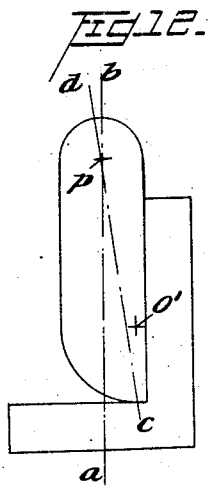
Figure 13:
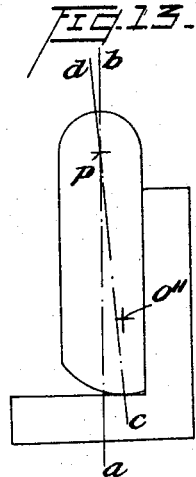

The struts which force the shoes against the rub face 23 are indicated at 42. Each strut has a rounded outer end which seats in a correspondingly formed socket in the center of the inner face of the brake shoe and each has an inner end adapted to roll on a plane surface formed on the corresponding strut seat and having a curved formation which will produce a substantially constant angle of thrust. Preferably the outer end of the strut is cylindrically curved. The inner end may have any curvature which will produce a substantially constant angle of thrust for the different angular positions of the strut and which will cause an automatic release of the friction upon cessation of movement of the absorber. The formation of the curved lower end of the strut determines the angle of thrust, as will be obvious from a consideration of Figs. 11, 12 and 13; and it will be clear that by the proper selection of the curvature of this lower end any desired angle of thrust may be secured. In the figures referred to, the line $a$—$b$ indicates the longitudinal center line of the strut and the line $c$—$d$ is drawn normal to the cylindrical outer end of the strut and through the contacting point between the lower end of the strut and its seat. In Figs. 11, 12 and 13, the curved lower ends of the struts are developed from centers $o$, $o'$ and $o''$, respectively, while the cylindrically curved outer ends are developed from a center $p$ located on the center line $a$—$b$. It will be observed that the angle of thrust is the angle which the line $c$—$d$ makes with a line intersecting it at the friction surfaces and passing through the center of oscillation of the absorber and that the magnitude of this angle varies directly with the angular relation between the centers $o$ and $p$ with respect to the center line of the strut, that is, varies directly with the angle included between the center line of the strut and the line passing through the centers $o$ and $p$. In Fig. 11 this angle is a maximum and the corresponding angle of thrust is large as compared with the angles of thrust produced by the strut formations shown in Figs. 12 and 13. In the examples shown and within the limits of oscillation provided there will be practically no variation in the angle of thrust for the several angular positions assumed by the strut. The radius of the curved lower end of the strut may be varied as conditions require, but this radius should be small enough to allow a free release and large enough to produce a rolling action as contradistinguished from a pivoting of the strut on substantially one point. The curve for the outer end of the strut may also be varied without departing from the spirit of the invention. It might, for example, be spherical instead of cylindrical. This curve is selected primarily with a view to minimizing wear.

Springs 45, having end abutments 46 and 47 respectively, are provided to normally thrust the brake shoes towards their engaged position, as shown in Fig. 3. The end members 47 are formed with points which engage within conical sockets in the sides of lugs 31, and the end members 46 press against the inner surfaces of the brake shoes and against sound deadening shims 48 which rest against the struts 42. To prevent springs 45 from bending or collapsing sidewise the end abutments are provided with mutually telescoping extensions, clearly shown in Fig. 6, which hold the abutment portions in coaxial relationship when the spring is compressed.

The selection of the tension of springs 45 has an important bearing on the proper functioning of the absorber under different conditions of use. When the absorber is new it has a slightly higher coefficient of friction than it has after the friction faces have become polished with use. An angle of thrust is selected such that, when the absorber is new, it will just barely cause proper engagement of the brake shoes without the aid of the push springs 45. These springs are provided in order that after this smoothing process has taken place, the power produced by the springs is such as to make up for the decrease in the coefficient of friction and thus cause the struts to function in the same manner as if there had not been such a decrease. These springs will also compensate for different effects produced on the absorber under different usages. For example, if the absorbers are used by hard drivers, the friction surfaces remain substantially dry, so that proper frictional resistance always occurs in spite of the smoothing process, whereas if the absorbers are used by easy drivers there is a falling off in the co-efficient of friction due to the slight accumulation of lubricant caused by lack of use. The push springs will compensate for this falling off in the coefficient of friction and thus prevent any loss of efficiency in the absorbers in the case of the easy driver.

As before stated, the strut seats are radially adjustable, but in each position of adjustment must be so firmly supported as to provide an absolutely rigid support for the struts. The inner surface of each of the strut seats is axially inclined, as shown in Figure 4, and a triangular wedge member 49 is provided with correspondingly inclined surfaces which fit closely thereagainst. The wedge member is centrally apertured, and a screw or bolt 50 has threaded engagement with this aperture, as shown clearly in Figure 4. By rotating the screw, the wedge 49 may be moved axially along the same. At all times the rounded point of the adjusting bolt rests against the face of the core member so that the wedge is rigidly supported thereby and may not move outwardly even when the pressure of the strut seats thereon becomes very great.

To effect the automatic adjustment of the bolt a spring 52 is provided, similar to a clock spring, the inner end of the spring passing through a slot 53 in the head of the adjusting bolt and its outer end being hooked through one of a plurality of apertures 54 in plate 33. The tension in the spring may be adjusted as desired by hooking its outer end through different apertures in plate 33, there being a plurality of such apertures. To limit the expansion of spring 52 so as to prevent it from ever rubbing against the inner wall of member 13, there is provided a band 52' loosely surrounding the spring and having a substantially smaller diameter than that of the chamber in member 13 in which the spring is housed.

In the operation of the device, the wedge will not move until wear of the struts and brake shoes occurs. As soon as looseness appears, due to such wear, and it is possible for the wedge 49 to move inwardly, the spring becomes effective to rotate the bolt 50 to move the wedge and to take up this wear. It is entirely unnecessary therefore to dismantle the shock absorber to make a suitable adjustment, and in fact is unnecessary to make any adjustment whatever, all adjustment being entirely automatic.

The apertures 54 in plate 33 serve not only as eyes into which the hooked end of spring 52 may be received and held, but also serve as apertures to permit the passage of lubricant between the chamber containing the spring and the chamber containing the struts and brake shoes. Holes 60 are also provided in flange 30 of the core to permit lubricant to escape from the central chamber to the outside of the flange or vice versa. These perforations in flange 30 and plate 33 are found necessary to permit the proper circulation of the lubricant in the operation of the device.

The corrugated shims 48, interposed between the struts and the springs are held in position by the springs. They prevent the direct impact of struts 42 on studs 35 as the shoes move toward fully released position, and because of being somewhat resilient take up the impact of the struts without noticeable noise. A modified form of sound deadening shim is illustrated in Figure 9. This shim is resilient due to the fact that it is arched by bending, as shown, but is not corrugated. Due to the pumping action produced by the shims as they spring in and out, there is an oil film constantly maintained on the shims which materially increases their sound-deadening qualities.

The interengaging threads 19 of the base and casing or shell 18 are "left hand" and therefore the torque exerted by the shoes on the case, which is in a counter-clockwise direction (Figure 3), merely tends to tighten the screw joint rather than loosen it. The same is true of the threaded joint 21 between the arm 15 and stud 20. But the threads of the joint between the lock washer 22 and stem 20 are right handed so that any tendency of the oscillating arm to back off of the stud 20 will merely result in tightening of the lock nut 22.

In Figure 3, the struts are shown in the position they would occupy if the greatest possible resistance were being exerted against the movable part of the shock absorber. Under this condition the springs 45 hold the struts against the backs of the seats 38 with the shoes 40 in fully engaged position. When rotation of the movable part of the absorber ceases, or when it is rotated in the releasing direction (clockwise, Fig. 3) the struts move away from the stops formed by the backs of the seats against the action of the springs 35 to fully released position; their lower ends rolling on the flat surfaces of the seats. Then upon rotation of the movable parts in the opposite or resistance producing direction, the angle of thrust of the struts causes frictional engagement of the shoes with the cylindrical face of member 18, and produces the required absorber effect. The struts are substantially unconfined in the resistance producing movement. In the practical operation of the device, however, one of the struts does actually engage its stop in the resistance producing direction of movement. This result is brought about by the floating center arrangement, the enlarged aperture in plate 33 for screw 50 making it possible for the wedge block 49 to get enough out of center to allow one of the struts to strike its stop without producing a great deal of braking tension. This action serves instantly to put all three brake shoes under an increased tension and the further action of the absorber builds this tension up to the maximum provided for through the action of the two remaining struts, the latter not coming into contact with the stops excepting during movements of such amplitude and velocity as to cause the absorber to offer its maximum resistance and falling back from the stops upon cessation of such movement, or, upon rotation of the movable element in the releasing direction.

Figure 14:
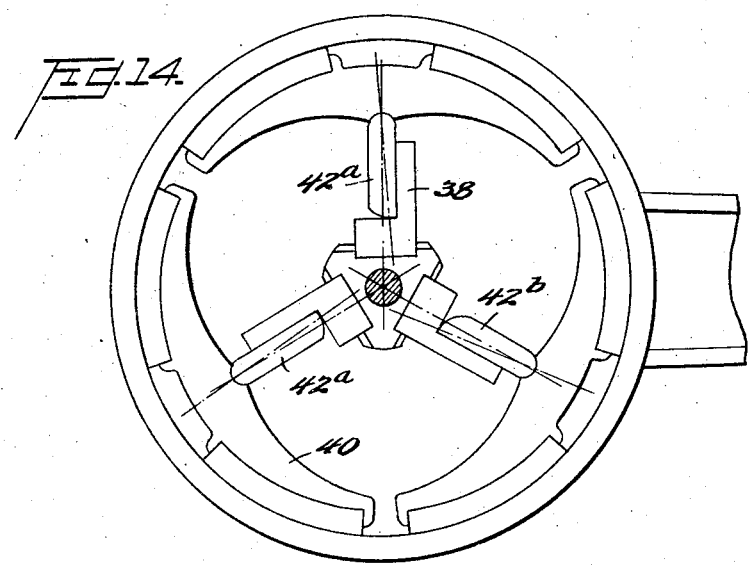
Figure 14 is a somewhat diagrammatic view showing a shock absorber employing struts of different angles of thrust.

We have discovered that improved results are obtained with struts operating at different angles of thrust. When struts of varying angle of thrust are used the absorber is more responsive to changes in velocity, that is, the difference between a slow pull on the absorber and a fast pull is more pronounced; furthermore, release upon cessation of movement is more certain and sharp. The most desirable shock absorber action is that which is light on smooth roads and heavy on rough roads, and unless the release upon cessation of movement occurs properly, there is a tendency of the absorber to get too heavy when used in long drives on boulevards. In shock absorbers employing struts having varying degrees of angle of thrust, the struts having the smaller angles are the ones which are first to operate, operative movement of the third strut not occurring unless the velocity of movement is such as to increase the coefficient of friction sufficiently to cause the angle of friction to be equal to or greater than the angle of thrust of the third strut. Also when relative movement between the frictional parts ceases and the coefficient of friction is thereby reduced to the coefficient of static friction, the angle of thrust for the third strut is then greater than the angle of friction; this being the case, the strut is then out of equilibrium and automatically releases. In other words, the angle of friction, or coefficient of friction, is greater when the friction surfaces are in motion. Thus, during movement, the angle of friction is equal to or greater than the angle of thrust in the third strut and the third strut functions during such movement, but upon cessation of movement the angle of friction decreases to the point where it is less than the angle of thrust for the third strut. When this condition occurs, the angle of friction, or coefficient of friction, is insufficient to hold the third strut in functioning position and the strut then falls back towards release position. Fig. 14 somewhat diagrammatically shows a shock absorber employing struts having different angles of thrust. In this view, the struts 42$^a$ have their inner ends curved to produce the same angle of thrust, but the curvature of the remaining strut 42$^b$ is such as to produce an angle of thrust somewhat larger than in the case of struts 42$^a$.

While a preferred form of the invention is disclosed together with a single modification, it will be understood that the preferred form is set forth by way of example only and, as will be appreciated by one skilled in the art, numerous other changes may be made in the design and arrangement of the parts without departing from its spirit and scope. For instance, the adjusting bolt 50 may be held against longitudinal inward movement by means of a flange 70 formed thereon (Figure 10) which rests upon plate 33 instead of having the point of the bolt resting against the core. With either construction a non-yielding resistance to the inward thrust of the struts is realized, but the form first described is preferred for the reason that there is less friction opposing the rotation of the bolt under the action of the spring.

Having thus described our invention what is claimed as new and desired to be secured by Letters Patent is:

1. A device for adjusting the strut seats of a shock absorber of the moving strut friction shoe type and having relatively movable base and frame members, including in combination, a rotatable threaded member having an inner end rotatably engaging and supported by the frame, and an outer end by which it may be rotated, and a nut on said member engaging the strut seats, rotation of the threaded member in one direction resulting in adjustment of the strut seats to compensate for wear of the mechanism and said seats being rigidly held in such adjusted position by said member and nut.

2. A device for adjusting the strut seats of a shock absorber of the moving strut friction shoe type and having relative movable base and frame members, including in combination, a rotatable threaded member having a rounded inner end which rotatably engages a flat surface of the frame and is supported thereby against axial movement in one direction and an outer end by which it may be rotated, and a nut on said member engaging the strut seats, rotation of the threaded member in one direction resulting in adjustment of the strut seats to compensate for wear of the mechanism, and said seats being rigidly held in such adjusted position by said member and nut.

3. The combination set forth in claim 2 in which means is provided to act on the outer end of the threaded member to automatically effect rotation thereof and axial movement of the nut, when wear occurs in the moving parts of the shock absorber.

4. In a shock absorber, relatively movable but non-separable members, means frictionally connecting said members including a brake shoe and a movable strut, an abutment limiting the movement of the strut toward releasing position, and a resilient shim for deadening the sound of impact of the strut on the abutment.

5. In a shock absorber of the class described, in combination, relatively rotatable base and frame members, one of said members having an internal annular face, brake shoes interposed between said members and adapted to bear against said annular face, means for thrusting said brake shoes against said annular face upon relative movement of said members in one direction and for releasing the same upon movement in the opposite direction, said means including a rigid strut for each shoe having their center lines concurrent on the axis of said base and frame members in the normal position of said members, the outer ends of said struts being curved on centers located on their respective center lines and the inner ends being curved on centers located at corresponding sides of the respective center lines, the outer ends of the struts articulating in corresponding sockets in said shoes and the inner ends thereof being adapted to roll on plane surfaces.

6. In a shock absorber of the class described, in combination, relatively rotatable base and frame members, said base member having an internal annular face, brake shoes interposed between said members adapted to bear against said annular face, means for thrusting said brake shoes against said annular face upon relative movement of said members in one direction and for releasing the same upon movement in the opposite direction, said means including a rigid strut for each shoe having their center lines concurrent on the axis of said base and frame members when the greatest force is acting on said members tending to produce relative rotation thereof, the outer end of each strut being developed from a center located on its center line and articulating in a corresponding socket in the respective brake shoe, and the inner end of each strut being developed from a center located at one side of the center line and adapted to roll on a surface rigid with said frame member.

7. A strut for a shock absorber of the class described having a cylindrical end portion and an end portion developed from a center offset from the longitudinal center line of the strut.

8. A strut for a shock absorber of the class described having an end portion curved on a center located on its longitudinal center line and an end portion developed from a center offset from said center line.

9. In a shock absorber, relatively movable members, means frictionally connecting said members including a brake shoe and a movable strut, a spring resisting the movement of the strut towards releasing position and a resilient sound-deadening shim between said spring and strut.

10. In a shock absorber, relatively movable members, means frictionally connecting said members including a brake shoe and a movable strut, a spring resisting the movement of the strut towards releasing position and a resilient corrugated plate between said spring and strut.

11. In a shock absorber, a base provided with an internal cylindrical face, a frame in said base rotatably mounted on an axis coincident with the axis of said internal face, brake shoes engaging said cylindrical face, seats carried by said frame, struts between said seats and brake shoes, abutments rigid with said frame, heads socketed in said abutments, members engaging said struts and brake shoes and coil springs between said heads and members.

12. A friction shock absorber comprising a cylindrical base having an imperforate partition near its inner end, a frame rotatably mounted in said base on an axis coincident with the axis thereof and comprising inner and outer circular plates, the inner plate forming with said partition a substantially closed chamber, friction shoes engaging the cylindrical inner surface of said base, struts mounted on said frame engaging said shoes, and means for automatically adjusting said struts including a rigid abutment, a screw on which said abutment is threaded, a spiral spring located in said chamber having its inner end connected to said screw, said inner plate being provided with a number of angularly spaced perforations adapted to be engaged by the outer end of said spring and affording passageways for lubricant.

13. A friction shock absorber comprising a base consisting of a cylindrical member adapted to be secured at its inner end to the frame of a vehicle, formed at its outer end with a reduced neck portion and near its inner end with an imperforate partition, a frame in said cylindrical member formed with a threaded boss projecting through said neck, an arm adapted to be connected at its outer end to a relatively movable part of the vehicle and formed at its inner end with an annular recess and with an interiorly threaded bore concentric with said recess, said arm being screwed on said boss the annular recess thereof receiving said neck, packing between said neck and arm, friction shoes engaging the inner wall of said cylindrical member, and means mounted on said frame for pressing said shoes against the wall of said cylindrical member in one direction of rotation of the frame and for relieving said pressure in the opposite direction of rotation of said frame.

14. A friction shock absorber comprising a base consisting of a cylindrical member adapted to be secured at its inner end to the frame of a vehicle and formed at its outer end with a reduced neck portion, a frame in said cylindrical member having a central boss projecting through said neck, an arm adapted to be connected at its outer end with a relatively movable part of the vehicle and formed at its inner end with an interiorly threaded bore screwed on said boss, packing between said arm and neck, and a lock nut screwed on the outer end of said boss, the threads of said bore and lock nut running in opposite directions.

15. A friction shock absorber comprising, in combination, a base consisting of a circular dished plate adapted to be fixed to the frame of a vehicle and providing a circular chamber opening outwardly, said plate being formed with an interiorly threaded annular flange concentric with said chamber and a cylindrical member screwed into said flange and formed at its outer end with a cylindrical neck, friction shoes engaging the inner wall of said cylindrical member, a rotatable frame in said cylindrical member having a central boss projecting through said neck, an arm having its outer end adapted to be connected to a relatively movable part of the vehicle and formed at its inner end with a threaded bore screwed on said boss, means forming a liquid tight union between said arm and neck, radially movable seats mounted in said frame, struts engaging at their outer ends said shoes and at their inner ends said seats, an abutment engaging the inner faces of said seats, the coacting faces of said seats and abutment being equally inclined to the axis of the absorber, a screw on which said abutment is threaded, the outer end of said screw being rounded and bearing against said frame, a spiral spring in said circular chamber having its inner end secured to said screw and its outer end adjustably secured to said frame, and a circular ring around said spring having a smaller diameter than the diameter of said chamber.

16. A friction shock absorber comprising, in combination, a base consisting of a circular dished plate adapted to be fixed to the frame of a vehicle and providing a circular chamber opening outwardly, said plate being formed with an interiorly threaded annular flange concentric with said chamber and a cylindrical member screwed into said flange and formed at its outer end with a cylindrical neck, friction shoes engaging the inner wall of said cylindrical member, a rotatable frame in said cylindrical member having a central boss projecting through said neck, an arm having its outer end adapted to be connected to a relatively movable part of the vehicle and formed at its inner end with a threaded bore screwed on said boss, means forming a liquid tight union between said arm and neck, radially movable seats mounted in said frame, struts engaging at their outer ends said shoes and at their inner ends said seats, an abutment engaging the inner faces of said seats, the coacting faces of said seats and abutment being equally inclined to the axis of the absorber, a screw on which said abutment is threaded, the outer end of said screw being rounded and bearing against said frame, a spiral spring in said circular chamber having its inner end secured to said screw and its outer end adjustably secured to said frame.

17. A friction shock absorber comprising, in combination, a base consisting of a circular dished plate adapted to be fixed to the frame of a vehicle and providing a circular chamber and a concentric outwardly extending interiorly threaded annular flange and a cylindrical member screwed into said annular flange and formed at its outer end with a reduced neck, a frame in said base comprising inner and outer spaced disks and triangular lugs between said disks forming radial guides, seats in said guides, struts bearing at their inner ends against said seats, friction shoes engaged by the outer ends of said struts, a rigid abutment for the inner ends of said seats, the coacting faces of said seats and abutments being equally inclined to the axis of the absorber, a screw on which said abutment is threaded, the outer end of said screw being grounded and bearing against the face of said outer disk, a spiral spring in said circular chamber having its inner end secured to said screw and its outer end adjustably secured to said inner disk, said inner and outer disks being provided with a plurality of perforations to effect a free circulation of lubricant, a circular band around said spring having a smaller diameter than the diameter of said circular chamber, an arm adapted to be connected at its outer end to a relatively movable part of the vehicle, said outer disk being formed with a central threaded boss and the inner end of said arm having a threaded bore screwed on said boss and formed with an annular chamber receiving said reduced neck, packing between said neck and arm, and a lock nut screwed on the outer end of said boss against said arm.

18. In a shock absorber of the class described, in combination, relatively rotatable base and frame members, one of said members having an internal annular face, brake shoes interposed between said members and adapted to bear against said annular face, means for thrusting the brake shoes against said annular face upon relative movement of said members in one direction and for releasing the same upon movement in the opposite direction, said means including a rigid strut for each shoe, the outer end of each strut being developed from a center located on its center line and articulating in a corresponding socket in the respective brake shoe, and the lower end of each strut being developed from a center located at one side of the center line and adapted to roll on a surface rigid with said frame member, the curvature of the lower end of one of the struts being different from that of the others to produce in said one strut a different angle of thrust.

19. In a shock absorber of the class described, in combination, relatively rotatable base and frame members, one of said members having an internal annular face, brake shoes interposed between said members and adapted to bear against said annular face, means for thrusting the brake shoes against said annular face upon relative movement of said members in one direction and for releasing the same upon movement in the opposite direction, said means including a rigid strut for each shoe bearing at one end against the shoe and at the other end against a seat rigid with one of said members, said struts having their ends curved to produce substantially invariable angles of thrust, one of said struts having a different angle of thrust from that of the others.

20. In a shock absorber of the class described, in combination, relatively rotatable base and frame members, one of said members having an internal annular face, brake shoes interposed between said members and adapted to bear against said annular face, means for producing frictional resistance to the relative movement of said members in one direction and substantially relieving such resistance on movement in the other direction, said means including a rigid strut for each shoe bearing at one end against the shoe and at the other end against a seat rigid with one of said members, said struts having their ends curved to produce substantially unvarying angles of thrust, the angle of thrust for one of said struts being larger than that of the others.

21. In a shock absorber of the class described, in combination, relatively rotatable base and frame members, one of said members having an internal annular face, brake shoes interposed between said members and adapted to bear against said annular face, means for producing frictional resistance to the relative movement of said members in one direction and substantially relieving such resistance on movement in the other direction, said means including a rigid strut for each shoe bearing at their outer ends against the shoes and at their inner ends against a seat rigid with one of said members, said struts being located along lines radiating from the axis of the absorber in the position of rest thereof, each strut having an outer curved end engaging a curved socket in its respective brake shoe and an inner end curved to produce a substantially unvarying angle of thrust of the strut in the resistance producing direction of movement.

22. A friction shock absorber comprising a base consisting of a cylindrical member adapted to be secured at its inner end to the frame of a vehicle and formed at its outer end with a reduced neck portion, a frame in said cylindrical member having a central boss projecting thru said neck, an arm adapted to be connected at its outer end with the relatively movable part of the vehicle and formed at its inner end with an interiorly threaded bore screwed on said boss and packing between said arm and neck.

23. A friction shock absorber comprising a base plate, a cylindrical casing threaded thereto, a rotatable frame within the casing, an arm having threaded engagement with the frame, and friction producing devices for operating relative rotative movement of the base and frame in one direction, the threaded connection between the base plate and casing and frame and arm being so fashioned as to tend to tighten these engagements when the friction producing devices are active.

In testimony whereof we hereunto affix our signatures.

JAMES PIERCE BALDWIN.
RICHARD A. KEESE.